US011932517B2

(12) United States Patent
Hofmeister et al.

(10) Patent No.: US 11,932,517 B2
(45) Date of Patent: Mar. 19, 2024

(54) CRANE AND DEVICE FOR CONTROLLING SAME

(71) Applicant: Liebherr-Werk Biberach Gmbh, Biberach an der Riss (DE)

(72) Inventors: Markus Hofmeister, Warthausen (DE); Tobias Englert, Laupheim (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 401 days.

(21) Appl. No.: 17/447,152

(22) Filed: Sep. 8, 2021

(65) Prior Publication Data

US 2022/0055868 A1 Feb. 24, 2022

Related U.S. Application Data

(63) Continuation of application No. PCT/EP2020/055792, filed on Mar. 5, 2020.

(30) Foreign Application Priority Data

Mar. 8, 2019 (DE) ........................ 20 2019 101 335
Apr. 29, 2019 (DE) ........................ 20 2019 102 393

(51) Int. Cl.
*B66C 13/06* (2006.01)
*B66C 13/16* (2006.01)
(Continued)

(52) U.S. Cl.
CPC ............ *B66C 13/063* (2013.01); *B66C 13/16* (2013.01); *B66C 13/46* (2013.01); *B66C 23/88* (2013.01)

(58) Field of Classification Search
CPC ....... B66C 13/06; B66C 13/063; B66C 13/46; B66C 23/88
See application file for complete search history.

(56) References Cited

U.S. PATENT DOCUMENTS 5,526,946 A 6/1996 Overton
2011/0187548 A1* 8/2011 Maynard .............. B66C 15/045 340/685
(Continued)

FOREIGN PATENT DOCUMENTS

CN 106477455 3/2017
DE 19725315 C2 3/2001
(Continued)

OTHER PUBLICATIONS

CN 106477455A Machine Translation (Year: 2017).*
EP 1806311A2 Machine Translation (Year: 2007).*
DE 102009016366 A1 Machine Translation (Year: 2009).*

*Primary Examiner* — Michael R Mansen
*Assistant Examiner* — Juan J Campos, Jr.
(74) *Attorney, Agent, or Firm* — Levine Bagade Han LLP

(57) ABSTRACT

The invention relates to a crane, in particular a rotary tower crane (1), comprising a crane boom (3), from which runs a hoisting cable (6) connected to the load hook (7), as well as comprising a load hook positioning device (8) for determining the load hook position, wherein the load hook positioning device (8) has at least three electromagnetic radio modules (9) exchanging radio signals with one another, of which at least one radio module is attached to the load hook and at least two further radio modules are attached to the crane structure and/or in the environment of the crane in a spaced apart manner, as well as an electronic evaluation device for evaluating the radio signals and determining the position of the load hook from the radio signals.

20 Claims, 2 Drawing Sheets

(51) Int. Cl.
*B66C 13/46* (2006.01)
*B66C 23/88* (2006.01)

(56) References Cited

U.S. PATENT DOCUMENTS

| | | | | |
|---|---|---|---|---|
| 2013/0161279 | A1 | 6/2013 | Schneider et al. | |
| 2015/0344271 | A1* | 12/2015 | Schneider | B66C 13/06 701/50 |
| 2016/0031683 | A1* | 2/2016 | Fenker | B66C 13/40 212/276 |
| 2018/0346294 | A1* | 12/2018 | Shely | B66C 23/905 |

FOREIGN PATENT DOCUMENTS

| | | | | |
|---|---|---|---|---|
| DE | 10324692 | | 1/2005 | |
| DE | 102006001279 | | 7/2007 | |
| DE | 102009016366 | A1 * | 12/2009 | B66C 13/18 |
| DE | 202008008174 | | 12/2009 | |
| DE | 102009032270 | | 1/2011 | |
| DE | 202008018260 | | 7/2012 | |
| DE | 112012000169 | | 7/2013 | |
| DE | 102013006258 | | 10/2014 | |
| DE | 102016004350 | | 10/2017 | |
| EP | 0823394 | | 2/1998 | |
| EP | 1806311 | A2 * | 7/2007 | B66C 13/46 |
| EP | 1628902 | | 10/2007 | |
| EP | 2110357 | | 10/2009 | |
| EP | 2562125 | | 2/2013 | |
| EP | 2931649 | | 10/2015 | |
| JP | 9-142773 | | 6/1997 | |
| WO | WO 1991/014644 | | 10/1991 | |
| WO | WO 2005/082770 | | 9/2005 | |
| WO | WO 2019/025602 | | 2/2019 | |
| WO | WO 2020/182592 | | 9/2020 | |

* cited by examiner

CRANE AND DEVICE FOR CONTROLLING SAME

CROSS-REFERENCE TO RELATED APPLICATIONS

This application is a continuation of International Patent Application Number PCT/EP2020/055792 filed Mar. 5, 2020, which claims priority to German Patent Application Numbers DE 20 2019 101 335.4 filed Mar. 8, 2019 and DE 20 2019 102 393.7 filed Apr. 29, 2019, the contents of which are incorporated herein by reference in their entireties.

BACKGROUND

The present invention relates to a crane such as a revolving tower crane having a crane boom from which a hoist rope connected to a load hook is connected and having a load hook position determination device for determining the load hook position. The invention further relates to a method and to a device for controlling such a crane in which the load hook position of a load hook connected to a hoist rope is detected by sensor means by a load hook position determination device.

Revolving tower cranes can have an at least approximately horizontal, optionally also upwardly luffable, crane boom that Is supported by a tower that extends upright and that can be rotated about the upright longitudinal tower axis. With a so-called top-slewer, the boom here rotates relative to the tower, whereas with a bottom-slewer, the total tower and thus the boom connected thereto in an articulated manner is rotated. The distance of the load hook from the tower axis can be set by means of a trolley that is travelable along the boom, with the hoist rope connected to the load hook running off over said trolley or also by luffing up a needle boom.

It is desirable in this process for various reasons to determine the exact position of the load hook as exactly as possible via a corresponding load hook position determination device. This cannot only be advantageous if the load hook is no longer visible to the crane operator, for example behind a wall, but rather also when the trolley position no longer corresponds exactly to the load hook position, i.e. is no longer congruent in the perpendicular direction (it is understood that the vertical position of the load hook and of the trolley differs due to the lowering depth of the load hook). Such a difference of the load hook position from the trolley position can have various reasons, for example a non-straight extent as a result of wind forces or harmonics of the hoist rope or dynamic excursions such as swaying movements of the load or wind deflections. Depending on the job to be done, it may be sufficient here to determine the load hook position only relative to the trolley or to the crane, for example to damp swaying movements, or an absolute load hook position in space can also be required, for example to implement an automated operation in transfer procedures. Apart from such uses of the load hook position signal for control purposes, increased safety can also be achieved by determining the load hook position since the load can be permanently monitored, with optionally a redundancy of the lowering depth sensor also being able to be achieved.

Such assistance systems of a crane such as sway damping that work by a determination of the load hook position are known, for example, from the documents DE 20 2008 018 260 U1 or DE 10 2009 032 270 A1 or also from the documents EP 16 28 902 B1, DE 10 324 692 A1, EP 25 62 125 B1, US 2013 01 61 279 A, or U.S. Pat. No. 5,526,946 B.

A load sway damping system is furthermore known from the company of Liebherr under the name "Cycoptronic" that calculates load movements and influences such as the wind in advance and initiates compensation movements based thereon, with the rope angle with respect to the vertical and its variations being detected by means of gyroscopes to intervene in the control in dependence on the gyroscope signals.

The load hook position can here generally be detected in different manners, with document WO 91/14644 A1 showing such a load hook position determination, for example.

It is already known from the prior art in this respect to optically detect the load hook position. JP 9-142773, for example, shows a crane at whose boom tip, from which the hoist rope runs off, a camera that faces downward is mounted whose viewing direction is adjusted to follow sway movements of the load hook so that the crane operator can always see the load hook via the camera. DE 197 25 315 C2 describes an ironworks crane having a trolley chassis that is travelable relative to a support frame and from which the hoist rope runs off. A plurality of cameras are arranged at the support frame and their field of view is large enough to be able to detect the crane hook at different trolley chassis positions. With such an ironworks crane, the positions to be traveled to are specified in a relatively rigid manner so that the image data volume to be processed remains manageable. If such a system were, however, to be used with a revolving tower crane, a flood of data would be produced that would hardly be able to be processed.

A revolving tower crane is furthermore known from WO 2005/082770 A1 to whose trolley a camera is arranged that faces downward to display a video image of the load hook environment to the crane operator so that the crane operator can better recognize obstacles disposed in the direction of movement. This camera system serves the visualization of obstacles or of the placement or pick-up zone that the crane operator has to head for; however, the load hook position relative to the crane or absolutely in space is not determined in this process.

It is, however, difficult with such camera systems to determine the load hook position sufficiently fast and sufficiently reliably since the image evaluation systems often have to process large data volumes and required a certain time for this with a limited processing power. There is additionally the fact that with large lowering depths, the load hook can only be seen as very small from the crane boom so that is has already been proposed in the document EP 2 931 649 B1 to provide the monitoring camera with an automatic zoom. However, the vision-impairing environmental influences such as fog or smoke can hereby not be addressed.

Document DE 10 2006 001279 suggests attaching a transmission and reception device at the trolley of a revolving tower crane that exchanges signals with radio modules at the load hook and at the boom, with the distance of the trolley from the tower and thus the outreach and the lowered depth of the load hook being determined with reference to the time of flight of the signals. To also determine a lateral offset of the load hook with respect to the trolley, the deflection angle of the hoist rope is measured by an inclinometer, from which measurement the outreach of the load is corrected in conjunction with the lowered depth or the offset of the load hook with respect to the trolley is determined.

It is therefore the underlying object of the present invention to provide an improved crane, an improved method, and an improved device for its control that avoid disadvantages of the prior art and further develop the latter in an advantageous manner. A reliable, precise determination of the load hook position should in particular be achieved in real time that remains as unaffected as possible by poor environmental conditions such as fog and smoke.

SUMMARY

In accordance with the invention, said object is achieved by a crane in accordance with claim 1, and by a device for its control in accordance with claim 17, and by a device in accordance with claim 20. Preferred embodiments of the invention are the subject of the dependent claims.

It is therefore proposed to attach electromagnetic radio modules to specific points of the crane that communicate with one another and to determine the position of the radio modules relative to one another with reference to the exchanged radio signals and to determine the load hook position from this. In accordance with the invention, the load hook position determination device has at least three electromagnetic radio modules that exchange radio signals with one another, of which at least one radio module is attached to the load hook and at least two further radio modules are attached spaced apart from one another at the crane structure, and furthermore has an evaluation device for evaluating the radio signals and determining the position of the load hook from the radio signals. In this process, the radio module at the load hook exchanges signals with each of the at least two further radio modules, with the evaluation device being able to determine the position of the load hook from the radio signals between the radio module at the load hook and the at least two further radio modules. Such electromagnetic radio signals are not affected by smoke and fog and can additionally be evaluated so fast that a position determination in real time becomes possible.

The radio modules can here generally be attached at different points of the crane structure, with a line-of-sight arrangement simplifying the evaluation of the radio signals or the determination of the positions of the radio modules relative to one another. If the crane has a trolley that is travelably supported along the boom and from which the hoist rope runs off, at least one radio module can be attached to said trolley in an advantageous further development of the invention to determine the position of the load hook relative to the trolley from the exchanged radio signals between the radio module at the load hook and the radio module at the trolley.

A plurality of radio modules can here advantageously be arranged distributed or spaced apart from one another on said trolley, which considerably facilitates the position determination of the load hook from the exchanged radio signals. At least three radio modules can in particular be arranged spaced apart from one another on the trolley, with the at least three radio modules advantageously not being arranged along a straight line, but rather at the corners of a triangle. The radio modules on the trolley can in particular be arranged offset from one another both in the longitudinal direction of the boom and transversely thereto, with the radio modules being able to be arranged in a common lying plane, in particular an approximately horizontal plane, or also in a plurality of differently positioned planes. Due to the distribution in the longitudinal boom direction and transversely thereto, the load hook position can be relatively easily determined from the radio signals between the load hook and the radio modules on the trolley when the load hook moves out of the position exactly vertical below the trolley, for example by swaying movements transversely to the longitudinal direction of the boom or also in parallel with it. Such transverse deflections can be produced on the braking of a rotational movement of the crane or on a travel movement of the trolley, but also under external influences such as wind.

More than three radio modules can optionally also be arranged on the trolley, for example at the corners of a rectangle that can extend in a horizontal plane.

In an advantageous further development of the invention, at least one radio module can also be fixedly mounted on the boom, for example at an end section or also exactly at the center of the crane boom. A plurality of radio modules can advantageously also be fixedly attached to the crane boom, in particular one respective radio module at the oppositely disposed end sections of the boom, with said end sections being able to be the projecting boom tip, on the one hand, and the articulated connection piece, on the other hand, by which the boom can be luffably connected in an articulated manner to the boom at the tower of a revolving tower crane or at the superstructure of a telescopic boom crane. The position of the trolley can be determined in a simple manner by radio modules at the end sections of the crane boom and optionally at a center section of the crane boom with reference to the radio signals that are exchanged between the trolley radio modules and the boom radio modules and/or the look hook position with respect to the longitudinal axis of the boom and thus also a sway offset with respect to the trolley can be determined in a simple manner from the radio signals that are exchanged between the boom radio modules and the load hook radio module.

In a further development of the invention, alternatively or additionally to said radio modules, one or more further radio modules can also be attached at a different point of the crane structure, for example at the tower of a revolving tower crane or also spaced apart from the crane at a different position on the construction site or at a different crane.

By exchanging radio signals between the radio module at the load hook and each or at least some of said further radio modules at the crane structure, not only the distance of the load hook from the boom or from the trolley can be determined in the sense of the lowered depth, but also a horizontal transverse offset of the load hook with respect to the run-off point of the hoist rope at boom or at the trolley and/or a horizontal deflection of the load hook with respect to the boom and thus position of the load hook relative to the crane structure, including the relative horizontal position, and indeed in particular also when the hoist rope with the load hook sways or is deflected by the wind or when the boom and/or the tower deform under load.

The radio modules are advantageously arranged distributed such that they have visual contact of one another, at least when no building edge or similar object contours is/are between the load hook and the crane structure.

To be able to supply the radio modules with electrical energy, an electrical energy store, for example in the form of a battery or of a rechargeable battery, can be associated with the radio modules, with a separate energy store being able to be associated with each individual radio module or also with a common energy store being able to be associated with a group of radio modules.

Alternatively or additionally to such batteries or rechargeable batteries, a generator can at least be associated with the radio module on the load hook, said generator providing electrical energy and being able to be driven by the rotational movement of a deflection pulley via which the hoist rope is deflected. The electric power provided by the generator can be delivered directly to the radio module, but can advantageously also be stored in a rechargeable battery. Power lines to the hook can be avoided by such a generator drivable by a deflection pulley and a permanent energy supply can nevertheless be ensured.

One or more generators can optionally also be associated with the radio modules at the trolley and/or at the boom, optionally in conjunction with a rechargeable battery, with a generator at the trolley and/or at the boom advantageously likewise being able to be driven by the rotational movement of a deflection pulley via which the hoist rope and/or the trolley rope is/are deflected.

The evaluation of the radio signals exchanged between the radio modules can generally take place in different manners and can optionally also comprise a plurality of different evaluation approaches to redundantly determine the position of the radio modules relative to one another and thus the load hook position or also to form an average from a plurality of determined position values.

The position determination device can in particular comprise a time of flight determination device to determine the time of flight of the radio signals between the radio modules. The distance between the radio modules, in particular also changes of the distance between two radio modules, can be determined from the time of flight of the radio signals since such a change is accompanied by a time of flight change.

The time of flight of the signals can in turn be determined in different manners in this process. For example, said time of flight determination device can comprise a TDOA (time difference of arrival) module and/or a TOA (time of arrival) module by means of which the difference in the arrival time or the arrival time itself can be determined at which a radio signal emitted by a radio module is received at another radio module. The TDOA module can in particular measure the time of flight difference of a time stamp which the radio signals have from, for example, the load hook radio module to other different radio modules at the crane structure, for example at the trolley and/or at the boom. The evaluation device can calculate the location or the position of the load hook radio module from the time of flight differences.

In contrast to this, the TOA module can work with absolute times, with the distance being able to be determined from the time offset between the transmission at a radio module and the reception at the other radio module. For example, one radio module can transmit a time stamp, while the reception time is determined at the other radio module and then the absolute radio time of flight can be calculated therefrom.

A time of flight sensor is also at times called a TOF module that can determine the time of flight of the radio signal from one radio module to the other.

Alternatively or additionally to a determination of the time of flight, a respective angle can also be determined at which a radio module receives a radio signal from a different radio module. A corresponding angle determination device for determining the radio signal angle can, for example, have a phase shift module that can determine the phase shift of the useful signals or of the received radio signals at the different radio modules. Alternatively or additionally, a damping determination module can determine damping in the antenna of a radio signal receiver caused by the directional radio pattern and can determine the angle of the radio signal from this.

The evaluation device can calculate the position of the radio modules relative to one another and thus the load hook position with reference to the determined radio signal angles that can be determined at the different radio modules. The evaluation device can in particular evaluate the radio signal angles trigonometrically to calculate the positions, in particular the load hook position, in conjunction with the known attachment locations of the radio modules.

In a further development of the invention, the radio modules can be configured as cellular radio modules and can work in accordance with a cellular radio standard known per se such as 4G or 5G. The position determination of the radio module at the load hook or also of the radio modules at the crane construction can be additionally improved via such cellular radio signals or also take place exclusively hereby.

Said evaluation device, preferably including said time of flight determination device and/or angle determination device, can generally be provided at a different point of the crane, for example implemented in the crane control, that also carries out other crane control work such as the movement control or the load limiting. Alternatively to this, said evaluation device can, however, in particular also be integrated on one of said radio modules or can form a common assembly together with one of the radio modules or can be combined in a common electronic assembly. Further data transmission paths and delays accompanying same can hereby be saved. The radio signals are evaluated directly where they are received.

In an advantageous further development of the invention, the position determination device can not only make use of said radio signals and their evaluation, but can also use even further sensor signals. At least one sensor device can in particular be provided, at least at the load hook, by means of which position data and/or orientation data and/or acceleration data can be determined that can be evaluated by the position determination device and that can be used for the position determination of the load hook.

An inertial measurement unit that can in particular comprise acceleration and rotation rate sensor means can, for example, be attached to the load hook to provide acceleration and rotation rate signals. Such an inertial measurement unit is at times also called an IMU and can measure the accelerations acting at the load hook and the rotation rates occurring thereat.

The acceleration and/or rotational rate data or generally the measured position data and/or orientation data and/or acceleration data measured by the sensor device can advantageously be transmitted from the radio module at the load hook itself to the other radio modules as part of the transferred radio signal. Alternatively, however, a separate transmission module would also be possible to transmit the sensor data to the evaluation device of the position determination device.

Said evaluation device can advantageously be configured to evaluate and to use both the radio signals of the electromagnetic radio modules in the previously described manner for the determination of the load hook position and to use the position data and/or orientation data and/or acceleration data of the sensor device, in particular the accelerations and rotation rates measured hereby for the position determination. The simultaneous use of the radio signals or of the parameters derived therefrom such as the time of flight or the radio signals, on the one hand, and of said sensor signals such as accelerations and rotation rates, on the other hand, can take place, for example, via a suitable filter device. The evaluation device can, for example, comprise a Kalman filter to merge and compare the different sets of signals with one another.

BRIEF DESCRIPTION OF THE DRAWINGS

The invention will be explained in more detail in the following with reference to a preferred embodiment and to associated drawings. There are shown in the drawings.

DETAILED DESCRIPTION

Figure 1:
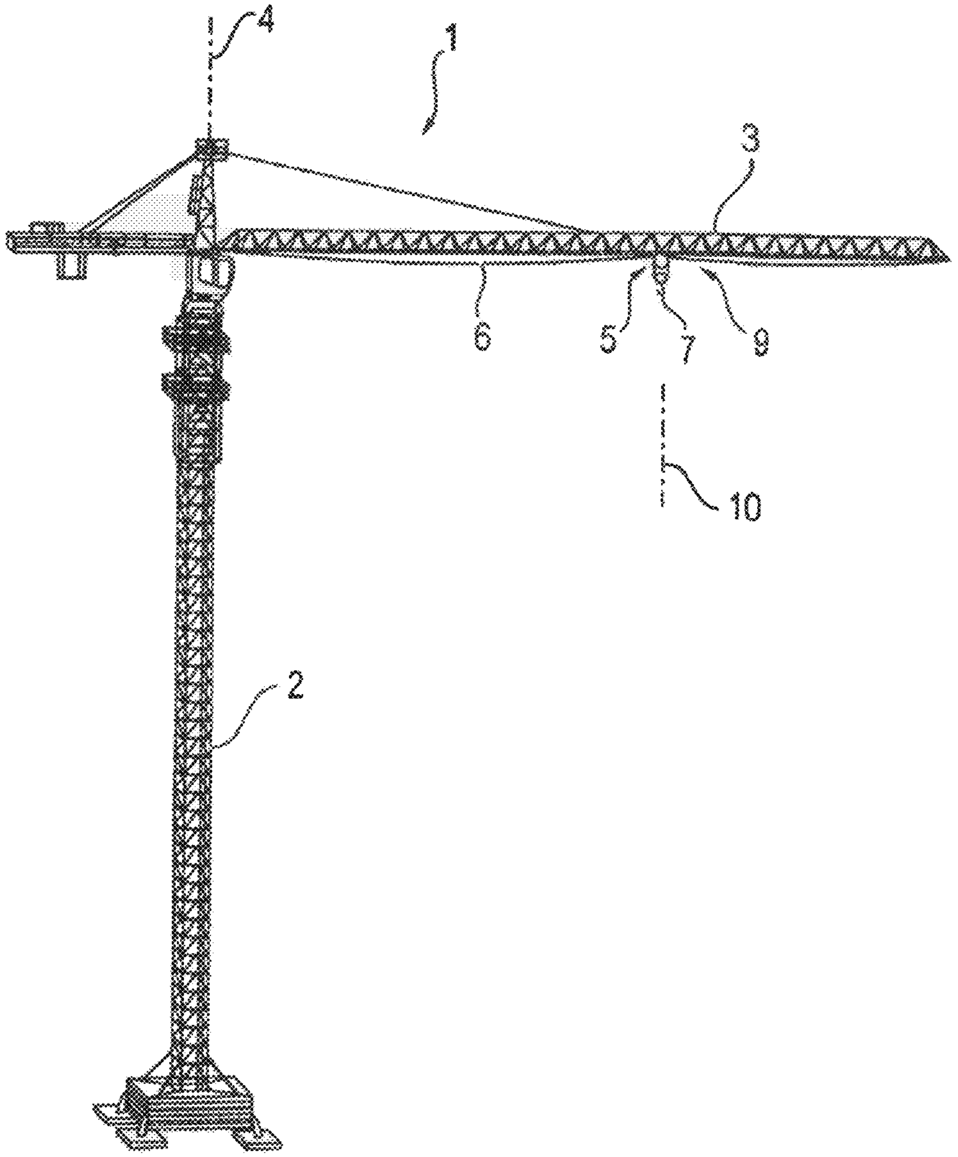
FIG. 1: a side view of a crane in the form of a revolving tower crane in accordance with an advantageous embodiment of the invention, at whose boom a travelable trolley is provided from which the hoist rope connected to a load hook runs off.

As FIG. 1 shows, the crane can, for example, be configured as a top-slewing revolving tower crane 1 whose tower 2, that extends upright, supports a boom 3 and optionally a counterboom. Said boom 3 can be rotated relative to the tower 2 about the upright longitudinal tower axis 4 and can adopt an at least approximately horizontal position. It would, however, alternatively also be possible with a configuration as a bottom-slewer that the tower 2 can be rotated together with the boom 3 with respect to the crane base. It would furthermore also be possible that the boom 3 can be luffed up and down about a horizontal transverse axis.

A trolley 5 is travelably suspended at said boom 3 so that the trolley 5 can be traveled substantially over the total length of the boom 3 to be able to vary the outreach of the load hook 7. Said load hook 7 is here fastened to a hoist rope 6 that runs off over said trolley 6 to be able to lower and raise the load hook 7. A load pulley 13 having one or more deflection pulleys can be provided at the load hook 7 in a manner known per se here via which the hoist rope 6 is deflected or reeved at the load hook 7.

Figure 2:
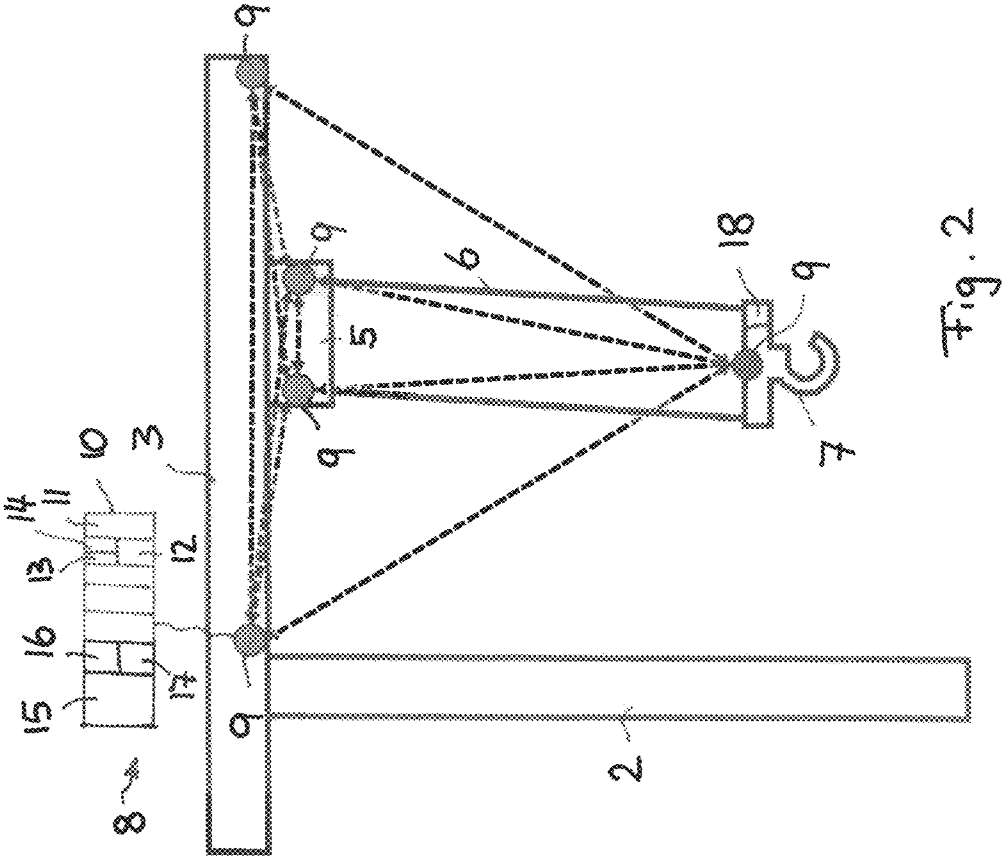
FIG. 2: a schematic side view of the crane of FIG. 1 that shows the arrangement of the radio modules at the load hook at the trolley and at the boom of the crane.

As FIG. 2 shows, a load hook position determination device 8 comprises a plurality of electromagnetic radio modules 9 that exchange electromagnetic radio signals with one another and can be configured, for example, as cellular radio modules in accordance with the 5G standard.

In this respect, at least one radio module 9 is fastened to the load hook 7, for example centered at an upper side of said deflection pulley. At least three further radio modules 9 are advantageously arranged at said trolley 5, with the radio modules 9 at the trolley 5 being able to be positioned at the trolley 5 offset from one another in the longitudinal boom direction and transversely thereto, in particular at the corners of an approximately equilateral triangle that is arranged in a horizontal plane. In other words, the radio modules 9 can be arranged at the same height at the trolley 5 and can be arranged offset along and transversely to the longitudinal boom axis.

As FIG. 2 shows, further radio modules 9 can be fastened to end sections of the crane boom 3.

Figure 3:
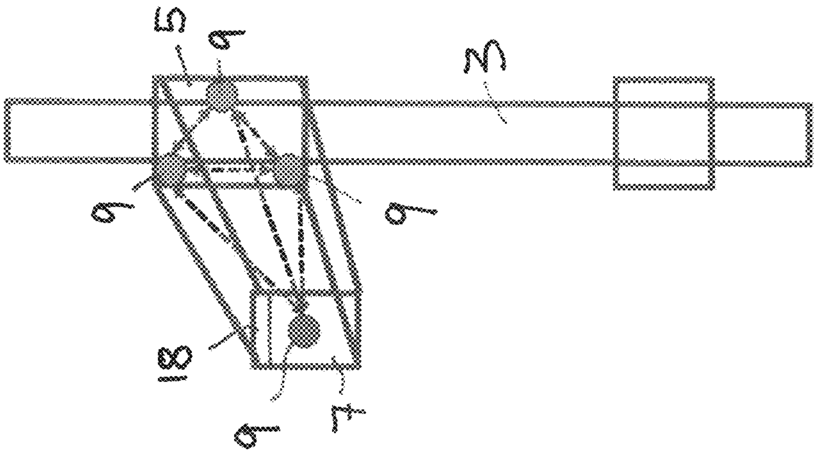
FIG. 3: a plan view of the crane of the preceding Figures that shows a transverse deflection of the load hook with respect to the trolley and the distribution of the radio modules at the load hook and trolley.

Said radio modules 9 all alternately exchange radio signals with one another as the arrows in FIGS. 2 and 3 illustrate. Alternatively or additionally, cabling is also possible to transmit the signals.

Said load hook position determination device 8 comprises an evaluation device 10 that can be configured in the form of an electronic processing unit, for example having a microprocessor and a program memory in which an evaluation algorithm or evaluation software can be stored.

The electronic evaluation device 10 can be provided at one of the radio modules 9, for example at the radio module 9 attached to the boom 3 in the proximity of the tower 2, but optionally also as part of the crane control.

Said electronic evaluation device 10 here advantageously comprises a time of flight determination device 11 that can be worked through as a software module by the microprocessor and that can determine the time of flight of the signals between the radio modules 9.

Said time of flight determination device 11 can here comprise a TDOA module 12, a TOA module 13, and/or a TOF module, 14, as previously explained to determine the signal time of flight with reference to the differences of the times of arrival and/or with reference to the absolute times of arrival, and/or the times of transmission and to calculate the distances between the radio modules 9 from them. Said TDOA, TOA, or TOF modules 12, 13, 14, can likewise be worked through in the form of a software module by the microprocessor of the electronic evaluation device. Said evaluation device 10 calculates the distances between the radio modules from the signal times of flight and in turn calculates the position of the radio module 9 attached to the load hook 7 relative to the trolley 7 and/or to the boom 3 from them.

Said evaluation device 10 can furthermore also comprise an angle determination device 15 by means of which the angles between the radio modules 9 can be calculated, in particular via the phase shifts of the radio signals at the different radio modules 9 and/or via damping caused by the directional radio pattern in the antennas of the radio modules 9. Said angle determination device 15 can comprise correspondingly configured phase shift modules and/or damping modules 16 and 17 that can determine the phase shifts and the damping. Said phase shift modules and damping modules 16 and 17 can likewise be configured in the form of software modules that can be carried out by the processor of the electronic evaluation device 10.

The angle determination device 15 can calculate the angles of the radio signals and thus the angles between the radio modules 9 with reference to the measured or determined phase shifts and/or damping. The position of the radio module 9 at the load hook and thus the load hook position can be calculated by the evaluation device 10 from the radio signals determined in such a manner using trigonometric calculations.

A sensor device 18 is furthermore provided at the load hook 9 to measure position values and/or orientation values and/or acceleration values of the load hook 7, with such a sensor device 18 in particular being able to measure the accelerations and rotation rates occurring at the load hook. For this purpose, the sensor device 18 can in particular comprise an inertial measurement unit that is attached to the load hook 7 and that can preferably transfer its measurement signals wirelessly to the evaluation device 10 of the load hook position determination device 8.

The load hook position can be calculated by the electronic evaluation device 10 with reference to the accelerations and rotation rates provided by the sensor device, for example using the method known per se in accordance with DE 10 2007 039 408 A1. To improve the detection accuracy, the results from this calculation with reference to the accelerations and the rotation rates can advantageously be merged with the position determination from the radio signals, for example of the time of flight measurement, in the electronic evaluation device 10 or in one of the radio modules 9, which can be implemented, for example, with the aid of a Kalman filter.

We claim:

1. A crane having a crane boom from which a hoist rope connected to a load hook runs off, and having a load hook position determiner for determining a load hook position of the load hook, wherein the load hook position determiner has electromagnetic radio modules configured to exchange radio signals with one another, wherein the electromagnetic radio modules comprise at least one radio module attached to the load hook and at least two radio modules spaced apart from one another and attached to the crane and/or in a crane environment, wherein the at least one radio module is configured to exchange radio signals with each of the at least two radio modules, wherein the at least one radio module has an electronic evaluator, and wherein the load hook position is determinable via the electronic evaluator from radio signals exchanged between the at least one radio module and the at least two radio modules.

2. The crane of claim 1, wherein a trolley is travelably supported along the crane boom, wherein the hoist rope runs off from the trolley, and wherein the electromagnetic radio modules further comprise at least one radio module attached to the trolley.

3. The crane of claim 1, wherein a trolley is travelably supported along the crane boom, wherein the hoist rope runs off from the trolley, wherein the electromagnetic radio modules further comprise at least three radio modules attached to the trolley such that the at least three radio modules are arranged at corners of a triangle in a vertical plan view of the trolley, wherein each of the at least three radio modules is configured to exchange signals with the at least the radio module, and wherein a position of the load hook relative to the trolley, including a horizontal offset of the load hook with respect to the trolley, is determinable via the electronic evaluator from radio signals exchanged between the at least one radio module and the at least three radio modules.

4. The crane of claim 1, wherein at least one radio module of the at least two radio modules is attached to the crane boom, wherein the electromagnetic radio modules further comprise at least one radio module attached to a trolley travelable along the crane boom, wherein the at least one radio module attached to the load hook is configured to exchange radio signals with the at least one radio module of the at least two radio modules and with the at least one radio module attached to the trolley, and wherein a position of the load hook relative to the crane boom, including a horizontal offset of the load hook with respect to the trolley caused by swaying, is determinable via the electronic evaluator from radio signals exchanged between the at least one radio module attached to the load hook and the at least one radio module of the at least two radio modules and the at least one radio module attached to the trolley.

5. The crane of claim 1, wherein the electromagnetic radio modules further comprise at least two radio modules spaced apart from one another and attached to at least each end section of the crane boom, wherein the at least one radio module is configured to exchange radio signals with each of the at least two radio modules spaced apart from one another and attached to at least each end section of the crane boom, and wherein a position of the load hook relative to the crane boom is determinable via the electronic evaluator from radio signals exchanged between the at least one radio module and the at least two radio modules spaced apart from one another and attached to at least each end section of the crane boom.

6. The crane of claim 1, wherein the electromagnetic radio modules are suppliable with electrical energy from an energy store.

7. The crane of claim 1, wherein the at least one radio module is suppliable with electrical energy from a generator rotationally drivable by a rope deflection pulley provided at at least the load hook.

8. The crane of claim 1, wherein the electronic evaluator has a time of flight determiner for determining signal times of flight between the electromagnetic radio modules and for determining distances between the electromagnetic radio modules from the signal times of flight.

9. The crane of claim 8, wherein the time of flight determiner comprises a TDOA module for determining time differences of arrival of a radio signal from one of the electromagnetic radio modules to other of the electromagnetic radio modules and for determining the signal times of flight between the electromagnetic radio modules.

10. The crane of claim 8, wherein the time of flight determiner comprises a TOA module or a TOF module for determining absolute times of arrival of a radio signal of one of the electromagnetic radio modules at other of the electromagnetic radio modules and wherein the distances between the electromagnetic radio modules are determinable via the TOA module or the TOF module from the absolute times of arrival or from transmission times.

11. The crane of claim 1, wherein the electronic evaluator has an angle determiner for determining angles between the electromagnetic radio modules, and wherein positions of the electromagnetic radio modules relative to one another are trigonometrically determinable via the electronic evaluator from angles determined by the angle determiner.

12. The crane of claim 11, wherein the angle determiner has a phase shift module for determining phase shifts of radio signals at the electromagnetic radio modules, and the angles between the electromagnetic radio modules are determinable via the angle determiner from phase shifts determined by the phase shift module.

13. The crane of claim 11, wherein the angle determiner has a damping module for determining a damping of antennas of the electromagnetic radio modules caused by a directional radio pattern, and wherein angles between the electromagnetic radio modules are determinable via the angle determiner from damping determined by the damping module.

14. The crane of claim 1, further comprising a sensor device provided at the load hook, wherein position data and/or orientation data and/or acceleration data is determinable via the sensor device, and wherein a load hook position is calculatable via the electronic evaluator from position data and/or orientation data and/or acceleration data detected by the sensor device.

15. The crane of claim 14, wherein the sensor device comprises an inertial measurement unit (IMU) having an acceleration detector and/or a rotation rate detector for providing acceleration signals and/or rotation rate signals, wherein the electronic evaluator has a first determiner for determining and/or estimating a tilt of the load hook from acceleration signals and/or rotational rate signals from the inertial measurement unit (IMU) and has a second determiner for determining a deflection of the hoist rope and/or of the load hook with respect to the vertical from a determined tilt of the load hook and an inertial acceleration of the load hook.

16. The crane of claim 14, wherein the electronic evaluator comprises has-a Kalman filter for merging the load hook position determined from the radio signals exchanged between the at least one radio module and the at least two radio modules and a load hook position determined from position data and/or orientation data and/or acceleration data detected by the sensor device.

17. A method of controlling a crane having a crane boom from which a hoist rope connected to a load hook runs off, and having a load hook position determiner for determining a load hook position of the load hook, wherein radio signals are exchanged between at least one radio module attached to the load hook and radio modules attached to the crane, and wherein the load hook position is determined by an electronic evaluator from the radio signals that are exchanged between the at least one radio module attached to the load hook and the radio modules attached to the crane.

18. The method of claim 17, wherein signal times of flight of the exchanged radio signals and/or of angles of the exchanged radio signals at the at least one radio module attached to the load hook and the radio modules attached to the crane are determined by the electronic evaluator, and wherein the load hook position is calculated from the signal times of flight and/or from the angles.

19. The method of claim 17, wherein a slewing gear and/or a hoisting gear and/or a trolley chassis of the crane are controlled with reference to the determined load hook position.

20. A device for controlling a crane having a crane boom from which a hoist rope connected to a load hook runs off, and having a load hook position determiner for determining a load hook position of the load hook, wherein radio signals are exchangeable between at least one radio module attached to the load hook and radio modules attached to the crane, and wherein the load hook position is determinable via an electronic evaluator from radio signals that are exchanged between the at least one radio module attached to the load hook and the radio modules attached to the crane.

* * * * *